US010072707B2

(12) United States Patent
Futae et al.

(10) Patent No.: US 10,072,707 B2
(45) Date of Patent: Sep. 11, 2018

(54) TAPERED LAND THRUST BEARING DEVICE AND TURBOCHARGER PROVIDED WITH THE BEARING DEVICE

(71) Applicant: MITSUBISHI HEAVY INDUSTRIES ENGINE & TURBOCHARGER, LTD., Sagamihara-shi, Kanagawa (JP)

(72) Inventors: Takaya Futae, Tokyo (JP); Hideaki Nishida, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 0 days.

(21) Appl. No.: 15/113,894

(22) PCT Filed: Feb. 27, 2014

(86) PCT No.: PCT/JP2014/054798
§ 371 (c)(1),
(2) Date: Jul. 25, 2016

(87) PCT Pub. No.: WO2015/128977
PCT Pub. Date: Sep. 3, 2015

(65) Prior Publication Data
US 2016/0348721 A1    Dec. 1, 2016

(51) Int. Cl.
*F16C 33/10*    (2006.01)
*F16C 17/04*    (2006.01)
(Continued)

(52) U.S. Cl.
CPC ........ *F16C 33/1075* (2013.01); *F01D 25/168* (2013.01); *F02B 39/00* (2013.01);
(Continued)

(58) Field of Classification Search
CPC ...... F16C 17/04; F16C 17/045; F16C 17/047; F16C 17/18; F16C 33/107; F16C 33/1075;
(Continued)

(56) References Cited

U.S. PATENT DOCUMENTS 1,494,010 A *  5/1924  Newhouse ............. F16C 17/04
                                                  384/125
3,293,931 A    12/1966  Beattie
(Continued)

FOREIGN PATENT DOCUMENTS

AT          74991 B      11/1918
CN      103277184 A       9/2013
(Continued)

OTHER PUBLICATIONS

Extended European Search Report issued in the corresponding EP Application No. 14884172.9, dated Jan. 30, 2017.
(Continued)

*Primary Examiner* — James Pilkington
(74) *Attorney, Agent, or Firm* — Birch, Stewart, Kolasch & Birch, LLP

(57) ABSTRACT

A tapered land thrust bearing device with a land surface having a substantially reduced area without changing the contour shape of the land surface even if the area of the land surface is small, and high mechanical efficiency, as well as a turbocharger provided with the bearing device. A tapered land thrust bearing device includes: a flange portion fitted onto a rotary shaft and including a first thrust portion; and a thrust member including a second thrust portion which is disposed around a through hole and which faces the first thrust portion of the flange portion.

14 Claims, 12 Drawing Sheets

(51) Int. Cl.
*F02B 39/00* (2006.01)
*F01D 25/16* (2006.01)
*F16C 33/12* (2006.01)
*F16C 17/18* (2006.01)

(52) U.S. Cl.
CPC ......... *F16C 17/045* (2013.01); *F16C 17/047* (2013.01); *F16C 17/18* (2013.01); *F16C 33/107* (2013.01); *F16C 33/128* (2013.01); *F05D 2220/40* (2013.01); *F05D 2250/182* (2013.01); *F05D 2250/183* (2013.01); *F05D 2250/191* (2013.01); *F05D 2250/292* (2013.01); *F05D 2250/611* (2013.01); *F16C 2360/24* (2013.01)

(58) Field of Classification Search
CPC . F16C 2360/23; F16C 2360/24; F01D 25/168
See application file for complete search history.

(56) References Cited

U.S. PATENT DOCUMENTS

| | | | | |
|---|---|---|---|---|
| 4,348,065 | A | * | 9/1982 | Yoshioka ............... F16C 17/04 384/121 |
| 4,453,837 | A | * | 6/1984 | Shimizu ............... F01D 25/168 384/121 |
| 9,593,682 | B2 | * | 3/2017 | Torres ................. F16C 17/045 |
| 2006/0051000 | A1 | | 3/2006 | Etsion et al. |
| 2014/0233873 | A1 | | 8/2014 | Hayashi et al. |

FOREIGN PATENT DOCUMENTS

| | | |
|---|---|---|
| CN | 103422976 A | 12/2013 |
| DE | 2 408 938 A1 | 10/1974 |
| DE | 4125165 A1 | 2/1993 |
| EP | 0092920 A1 | 11/1983 |
| GB | 829481 A | 3/1960 |
| JP | 1-133559 U | 9/1989 |
| JP | 10-213130 A | 8/1998 |
| JP | 2003-222123 A | 8/2003 |
| JP | 2008-95903 A | 4/2008 |
| JP | 2009-197772 A | 9/2009 |
| JP | 4511412 B2 | 7/2010 |
| JP | 2011-131289 A | 7/2011 |
| WO | WO 2013/099600 A1 | 7/2013 |

OTHER PUBLICATIONS

International Preliminary Report on Patentability and Written Opinion of the International Searching Authority (Forms PCT/IB/338, PCT/IB/373, PCT/IB/326 and PCT/ISA/237), dated Sep. 9, 2016, for International Application No. PCT/JP2014/054798, with an English translation of the Written Opinion.

International Search Report and English translation thereof (Forms PCT/ISA/220 and PCT/ISA/210), dated May 13, 2014, for International Application No. PCT/JP2014/054798.

Office Action effective Oct. 19, 2017 issued to the corresponding CN Application No. 201480074123.8 with a machine English Translation.

* cited by examiner

L*: SUBSTANTIAL LENGTH OF LAND SURFACE
IN CIRCUMFERENTIAL DIRECTION

L*: SUBSTANTIAL LENGTH OF LAND SURFACE IN CIRCUMFERENTIAL DIRECTION

L*: SUBSTANTIAL LENGTH OF LAND SURFACE
IN CIRCUMFERENTIAL DIRECTION

L*: SUBSTANTIAL LENGTH OF LAND SURFACE IN CIRCUMFERENTIAL DIRECTION

INSIDE ←→ OUTSIDE
RADIAL DIRECTION

TAPERED LAND THRUST BEARING DEVICE AND TURBOCHARGER PROVIDED WITH THE BEARING DEVICE

TECHNICAL FIELD

The present disclosure relates to a tapered land thrust bearing device and a turbocharger provided with the bearing device.

BACKGROUND ART

For instance, a turbocharger for an automobile includes a turbine and a compressor, and a turbine blade of the turbine and an impeller of the compressor are coupled to each other via a rotor shaft. The rotor shaft is supported rotatably by a thrust bearing, which supports loads in the axial direction.

For instance, Patent Document 1 discloses a thrust bearing which is a tapered land thrust bearing including a thrust collar fitted onto a rotor shaft and a thrust member penetrated by the rotor shaft and disposed facing the trust collar. The thrust member includes a plurality of tapered surfaces and a plurality of land surfaces disposed alternately in the circumferential direction within an annular region facing the thrust collar.

Patent Document 2 discloses forming dimples on an upper surface of a slide bearing with a step to increase a lubricant-film pressure.

CITATION LIST

Patent Literature

Patent Document 1: JP2009-197772A
Patent Document 2: JP2008-95903A

SUMMARY

Problems to be Solved

Mechanical loss can be reduced with a tapered land thrust bearing, by shortening the length of a land surface in the circumferential direction, in other words, by reducing the area and central angle of a land surface. However, reducing the length of a land surface in the circumferential direction means changing the contour of the land surface, and the inclination angle of a tapered surface needs to be slightly changed to increase the length of the tapered surface in the circumferential direction, which requires high processing accuracy. Thus, if the land surface has a small outer diameter in particular, it is difficult to reduce the length of the land surface in the circumferential direction.

While Patent Document 2 discloses forming dimples on an upper surface of a slide bearing having a step, it does not disclose reduction of mechanical loss by reducing the length of a land surface in the circumferential direction for a tapered land thrust bearing device, nor how to reduce the length of the land surface in the circumferential direction.

Accordingly, an object of at least one embodiment of the present invention is to provide a tapered land thrust bearing device with a land surface having a substantially reduced area without changing the contour shape of the land surface even if the area of the land surface is small, and excellent mechanical efficiency, as well as a turbocharger provided with the bearing device.

Solution to the Problems

A tapered land thrust bearing device according to at least one embodiment of the present invention comprises: a rotary shaft; a flange portion fitted onto the rotary shaft and including a first thrust portion; and a thrust member including a through hole through which the rotary shaft is inserted and a second thrust portion which is disposed around the through hole and which faces the first thrust portion of the flange portion. One of the first thrust portion or the second thrust portion includes: a plurality of land surfaces each of which is parallel to a plane orthogonal to an axis of the rotary shaft, the land surfaces being disposed at intervals in a circumferential direction of the through hole; a plurality of tapered surfaces each of which is disposed between the plurality of land surfaces, joined via a step to a boundary of the land surface on one side in the circumferential direction of the through hole, and joined continuously to a boundary of the land surface on the other side in the circumferential direction of the through hole; and at least one concave portion disposed on each of the plurality of land surfaces.

With this configuration, at least one concave portion is formed on the land surfaces, and thereby the bearing gap is widened in the region with the concave portion, between the first thrust portion and the second thrust portion, and it is possible to reduce the substantial area of the land surfaces. As a result of reduction of the substantial area of the land surfaces, mechanical loss is reduced, and mechanical efficiency improves.

Further, forming the concave portion is easier than changing the contour of the land surfaces to reduce the area of the land surfaces. Thus, with this configuration, even if the land surfaces are small, it is possible to reduce the substantial area of the land surfaces at high accuracy.

In some embodiments, the plurality of land surfaces comprises three or more land surfaces. A diameter of an outer circumference of the plurality of land surfaces is not more than 15 mm, and an inclination angle of the tapered surfaces is within a range of from 1e-5° to 1.0°.

With this configuration, the plurality of land surfaces comprises three or more land surfaces, and the diameter of the outer circumference of the plurality of land surfaces is 15 mm or less, and the inclination angle of the tapered surfaces is in a range of from 1e-5° to 1.0°, and still the substantial area of the land surfaces can be reduced easily without changing the contour of the land surfaces, by forming the at least one concave portion.

In some embodiments, the at least one concave portion comprises a plurality of concave portions.

With this configuration, the plurality of concave portions is provided to reduce the substantial area of the land surfaces, and thus it is possible to reduce the substantial area of the land surfaces at high accuracy by adjusting the number of the concave portions.

In some embodiments, the plurality of concave portions comprises a plurality of first concave portions disposed along a radial direction of the through hole. On each of the plurality of land surfaces, the plurality of first concave portions is disposed within a region of from 10% to 20% central angle from the boundary of the land surface. Each of the plurality of first concave portions has a depth within a range of from 0.001 mm to 0.025 mm.

With this configuration, the first concave portions disposed in the radial direction in a predetermined region in the vicinity of the boundary has a depth in a range of from 0.001 mm to 0.025 mm, and thereby it is possible to reduce the substantial area of the land surfaces securely with the first concave portions.

In some embodiments, the plurality of concave portions is disposed along the radial direction and the circumferential direction of the through hole. A part of the plurality of concave portions comprises a plurality of first concave portions disposed along the radial direction of the through hole. On each of the plurality of land surfaces, the plurality of first concave portions is disposed within a region of from 10% to 20% central angle from the boundary of the land surface. Each of the plurality of first concave portions has a depth within a range of from 0.001 mm to 0.025 mm.

With this configuration, the first concave portions disposed in the radial direction in a predetermined region in the vicinity of the boundary has a depth in a range of from 0.001 mm to 0.025 mm, and thereby it is possible to reduce the area of the substantial land surfaces securely with the first concave portions.

In some embodiments, opening areas of the first concave portions increase outward in stages in the radial direction of the through hole.

With this configuration, the opening areas of the first concave portions increase outward in the radial direction, and thereby it is possible to reduce the length in the circumferential direction of the land surfaces substantially at a constant ratio regardless of the radial position.

In some embodiments, depths of the plurality of concave portions change in stages along the circumferential direction of the through hole.

With this configuration, the depths of the concave portions are varied in stages, and thereby it is possible to adjust a pressure distribution of lubricant oil in the bearing gap formed by the land surfaces.

In some embodiments, the plurality of concave portions is disposed in a spiral pattern or a herringbone pattern.

With this configuration, the plurality of concave portions arranged in a spiral pattern or a herringbone pattern makes it possible to guide lubricant oil along the circumferential direction of the land surfaces in the bearing gap formed by the land surfaces, and to increase a pressure of lubricant oil in the bearing gap efficiently.

In some embodiments, one of the first thrust portion or the second thrust portion having the plurality of land surfaces formed thereon further includes an annular surface which extends along outer circumferential edges of the land surfaces and outer circumferential edges of the tapered surfaces in the circumferential direction of the through hole, and a surface roughness of the land surfaces is greater than a surface roughness of the annular surface.

If lubricant oil is supplied onto the tapered surface outward in the radial direction of the through hole, the lubricant oil may try to flow out outward in the radial direction also in the bearing gap formed by the land surfaces. If a flow direction of lubricant oil can be oriented in the circumferential direction, it is possible to increase a pressure of lubricant oil in the bearing gap.

In this regard, if the surface roughness of the land surfaces is greater than the surface roughness of the annular surface, the annular surface is smoother and thus a relatively thicker layer is formed on the annular surface than on the land surfaces. Thus, when the lubricant oil flows out from the bearing gap outward in the radial direction, the speed of the lubricant oil decreases outside the outer circumferential edges of the land surfaces, and the pressure of the lubricant oil increases in accordance. This pressure difference becomes an obstacle that reduces outflow of the lubricant oil from the bearing gap outward in the radial direction, and thereby the lubricant oil can flow along the circumferential direction.

In some embodiments, a plurality of microscopic holes is formed on each of the plurality of land surfaces, and each of the plurality of microscopic holes has a depth which is $1/10$ to $1/100$ times a depth of the at least one concave portion.

With this configuration, besides the concave portions, the plurality of microscopic holes having a $1/10$ to $1/100$ depth of the depth of the concave portion is provided, and thereby it is possible to achieve a greater surface roughness for the land surfaces than for the annular surface.

In some embodiments, the plurality of microscopic holes on the land surfaces comprises small holes of a porous material, and the annular surface comprises a cover material which covers the porous material.

With this configuration, in the region forming the annular surface, the porous material is covered with the cover member, and thereby it is possible to readily achieve a smaller surface roughness for the annular surface than for the land surfaces.

A turbocharger according to at least one embodiment of the present invention comprises: the tapered land thrust bearing device according to any one of the above configurations; a centrifugal compressor including an impeller; and a turbine including a turbine blade, wherein the turbine blade and the impeller are coupled to each other via the rotary shaft.

With the above configuration, the tapered land thrust bearing device has excellent mechanical efficiency, and thus the torque of the turbine blade is transmitted to the impeller with reduced loss. As a result, the turbocharger also has excellent mechanical efficiency.

Advantageous Effects

According to at least one embodiment of the present invention, provided is a tapered land thrust bearing device with a land surface having a substantially reduced area without changing the contour shape of the land surface even if the area of the land surface is small, and excellent mechanical efficiency, as well as a turbocharger provided with the bearing device.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention. For instance, an expression stating that something is along a direction includes not only being strictly parallel to the direction but also being inclined from the direction with tolerance or a certain angular degree, where needed. Further, an expression "substantially" means that description may include an error within a range of tolerance or modification that is normally performed.

Figure 1:
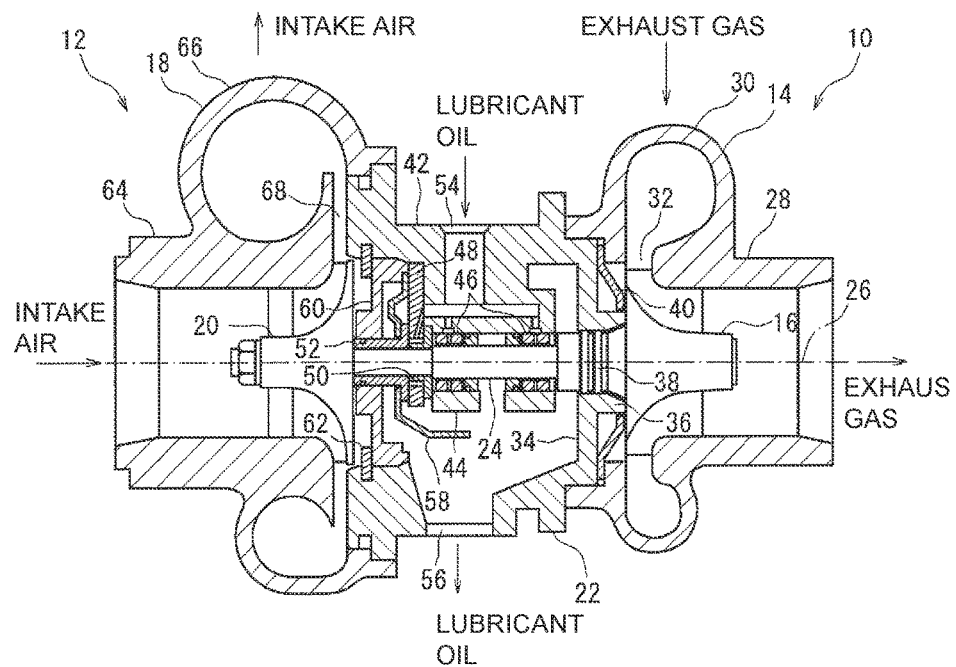
FIG. 1 is a vertical cross-sectional view schematically showing a turbocharger according to some embodiments of the present invention.

FIG. 1 is a vertical cross-sectional view schematically showing a turbocharger according to some embodiments of the present invention. A turbocharger is, for instance, applied to an internal combustion engine of a vehicle, a ship, or the like.

The turbocharger includes a turbine 10 and a compressor 12 of centrifugal type. The turbine 10 includes a turbine housing 14, a turbine blade (turbine impeller) 16 accommodated rotatably in the turbine housing 14, while the compressor 12 includes a compressor housing 18 and an impeller (compressor impeller) 20 accommodated rotatably in the compressor housing 18.

The turbine housing 14 and the compressor housing 18 are fixed to a bearing housing 22 via a non-depicted fastening member, and the turbine blade 16 of the turbine 10 and the impeller 20 of the compressor 12 are coupled to each other by a drive shaft (turbine rotor) 24 extending inside the bearing housing 22. Thus, the turbine blade 16, the impeller 20, and the drive shaft 24 are disposed on the same axis 26. The turbine blade 16 of the turbine 10 is rotated by exhaust gas discharged from the internal combustion engine, for instance, whereby the impeller 20 of the compressor 12 is rotated via the drive shaft 24. Rotation of the impeller 20 of the compressor 12 compresses intake air to be supplied to the internal combustion engine.

For instance, the turbine housing 14 includes a cylindrical (shroud) section 28 which accommodates the turbine blade 16, and a scroll section 30 surrounding the cylindrical section 28 at a part adjacent to the bearing housing 22. The scroll section 30 has a non-depicted inlet of exhaust gas, and is in communication with the cylindrical section 28 via a throat portion 32. An opening of the cylindrical section 28 on the opposite side from the bearing housing 22 forms an outlet of exhaust gas.

To an opening of the turbine housing 14 on the side of the bearing housing 22, an end wall 34 of the bearing housing 22 is fitted and engaged. A seal portion 36 of a cylindrical shape is integrally and co-axially disposed on the end wall 34, and the seal portion 36 forms a seal hole that penetrates through the center of the end wall 34. An end portion of the drive shaft 24 on the side of the turbine blade 16 is disposed inside the seal portion 36, and a seal ring 38 is disposed in a gap between the drive shaft 24 and the seal portion 36.

A back plate 40 of an annular shape is disposed in an annular recess between the end wall 34 and a back surface of the turbine blade 16. An outer rim portion of the back plate 40 is sandwiched by the turbine housing 14 and the bearing housing 22, and an inner rim portion of the back plate 40 surrounds the seal portion 36.

A bearing section 44 is disposed integrally with a peripheral wall 42 inside the bearing housing 22, and a bearing hole is formed on the bearing section 44. Two floating bushes 46, for instance, are disposed inside the bearing hole of the bearing section 44 to function as a radial bearing, and the center part of the drive shaft 24 is disposed inside the bearing hole of the bearing section 44 while being inserted through the floating bushes 46.

A thrust member 48 of a plate shape orthogonal to the axis 26 is fixed to an end surface of the bearing section 44 on the side of the compressor 12, and the drive shaft 24 is inserted through a through hole of the thrust member 48. A thrust collar 50 and a thrust sleeve 52 are fitted onto the drive shaft 24, and the thrust member 48, the thrust collar 50, and the thrust sleeve 52 form a thrust bearing device.

An oil feed port 54 and an oil drain port 56 are disposed on the peripheral wall 42 of the bearing housing 22, and an oil feed passage for feeding lubricant oil to bearing gaps of the radial bearing and the thrust bearing is formed through the bearing section 44 and the thrust member 48. Further, an oil deflector 58 is disposed so as to surround a face of the thrust member 48 on the side of the compressor 12 to prevent lubricant oil from scattering toward the compressor 12.

A lid member 60 with a seal hole in the center is fitted on to an opening of the bearing housing 22 on the side of the compressor 12, and the lid member 60 is fixed to the bearing housing 22 by a fixing ring 62. The thrust sleeve 52 is inserted through the seal hole of the lid member 60, and a non-depicted seal ring is disposed in a gap between the thrust sleeve 52 and the seal hole.

For instance, the compressor housing 18 includes a cylindrical (shroud) section 64 accommodating an impeller 20, and a scroll section 66 surrounding the cylindrical section 64 at a part adjacent to the bearing housing 22. The scroll section 66 has a non-depicted outlet of air supply, and is in communication with the cylindrical section 64 via a diffuser section 68. An opening of the cylindrical section 64 on the opposite side from the bearing housing 22 forms an inlet of intake air.

Figure 2:
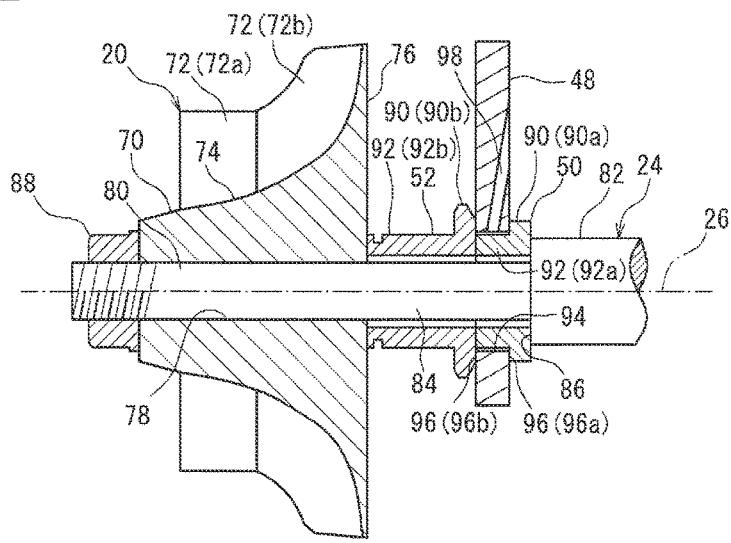
FIG. 2 is a view for describing an attachment structure of a thrust bearing with respect to a drive shaft.

FIG. 2 is a view for describing an attachment structure of a thrust bearing with respect to a drive shaft (rotary shaft) 24.

The impeller 20 includes a hub 70 and a plurality of blades 72. The hub 70 has a shape which is rotationally symmetric with respect to the axis 26. An end side of the hub 70 is disposed on the inlet side of intake air, and the other end side of the hub 70 is disposed on the side of the diffuser section 68, in a direction along the axis 26. An outer peripheral surface 74 of the hub 70 has a trumpet shape that expands toward the other end side, and the hub 70 has a back surface 76 that faces the lid member 60 on the other end side.

The hub 70 has an attachment hole 78 penetrating through the hub 70 along the axis 26, and the attachment hole 78 has openings on either side of the hub 70. A plurality of blades 72 is disposed integrally on the outer peripheral surface 74 of the hub 70, and is arranged at a predetermined interval in the circumferential direction of the hub 70. In some embodiments, the plurality of blades 72 includes full blades 72a and splitter blades 72b which are shorter than the full blades 72a in a direction along the axis 26, and the full blade 72a and the splitter blade 72b are disposed alternately in the circumferential direction.

The drive shaft 24 includes a shaft section 80, a large-diameter section 82, and a middle section 84, which are formed integrally with one another. The shaft section 80 extends inside the attachment hole 78 of the impeller 20, and the large-diameter section 82 is separated from the impeller 20. The middle section 84 is disposed between the shaft section 80 and the large-diameter section 82. The middle section 84 has a smaller diameter than the large-diameter section 82, and a stepped portion 86 is formed on the boundary between the middle section 84 and the large-diameter section 82.

A female screw is formed on a distal end side of the shaft section 80 disposed on one end side of the impeller 20, and a nut as a fastening member 88 is screwed onto the female screw. The fastening member 88 is in contact with the one end side of the impeller 20, and applies an axial force to the impeller 20 toward the stepped portion 86 in a direction along the axis 26.

At least one flange portion 90 is fitted onto the middle section 84 of the drive shaft 24. In some embodiments, each of the thrust collar 50 and the thrust collar 52 fitted onto the middle section 84 in series has a flange portion 90 (90a, 90b).

Further, the thrust collar 50 and the thrust sleeve 52 include sleeve portions 92 (92a, 92b) integrally formed with the flange portions 90 (90a, 90b), respectively, and the sleeve portions 92 (92a, 92b) are fitted onto the middle section 84. The sleeve portion 92a is disposed between the flange portion 90a and the flange portion 90b, and the sleeve portion 92b is disposed between the flange portion 90b and the impeller 20.

The thrust collar 50 and the thrust sleeve 52 are held between a back surface 76 of the impeller 20 and the stepped portion 86 by an axial force of the fastening member 88, and configured to rotate with the drive shaft 24.

The thrust member 48 has a through hole 94 penetrated by the middle section 84, and the sleeve portion 92a is disposed between the inner peripheral surface of the through hole 94 and the outer peripheral surface of the middle section 84. The thrust member 48 has a thrust portion 96 which is disposed around the through hole 94 and which is in slide contact with the flange portions 90a, 90b in a direction along the axis 26 while facing the flange portions 90a, 90b. In some embodiments, the thrust member 48 includes the thrust portion 96 (96a, 96b) on either side in a direction along the axis 26.

Further, the thrust member 48 has an oil-feed hole 98 forming an oil feed passage, and an outlet of the oil-feed hole 98 is disposed on the inner peripheral surface of the through hole 94. Lubricant oil which flows out through the outlet of the oil-feed hole 98 is supplied to clearance between the thrust portions 96 (96a, 96b) and the flange portions 90 (90a, 90b) through a gap between the outer peripheral surface of the sleeve portion 92a and the inner peripheral surface of the through hole 94.

Figure 3:
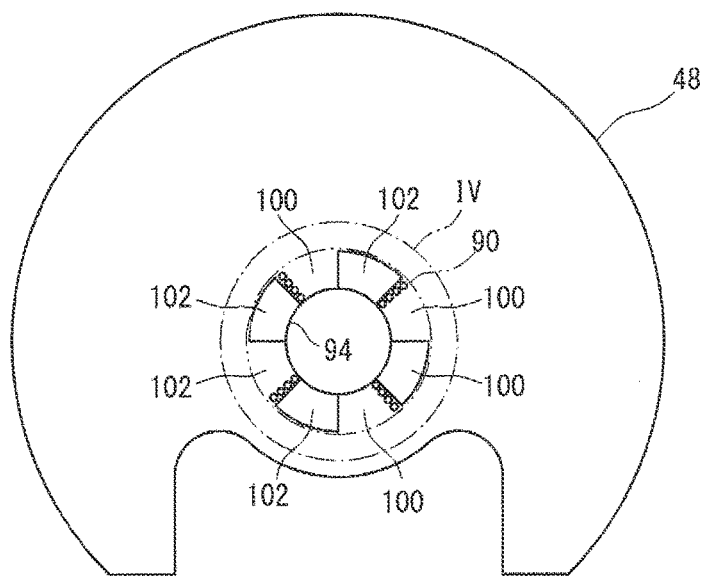
FIG. 3 is a planar view schematically showing a thrust member.
Figure 4:
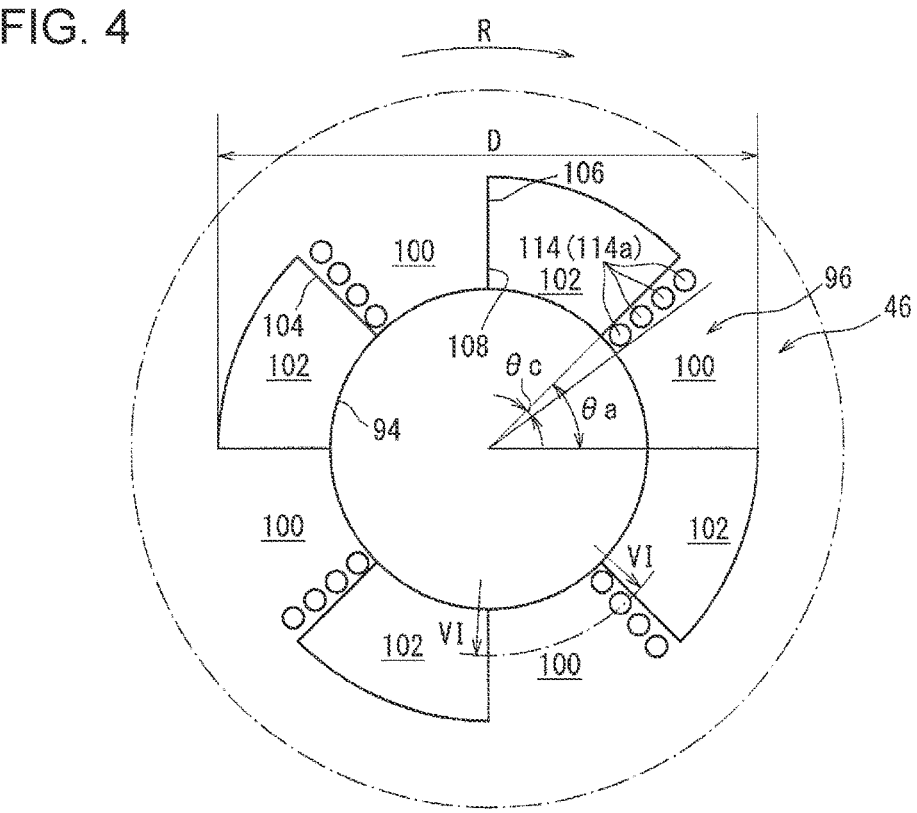
FIG. 4 is an enlarged view of region IV in FIG. 3.
Figure 5:
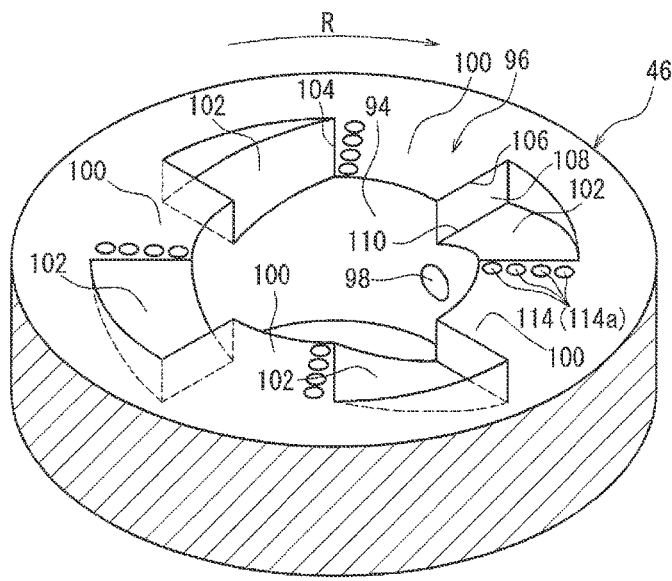
FIG. 5 is an enlarged perspective view of region IV in FIG. 3.
Figure 6:
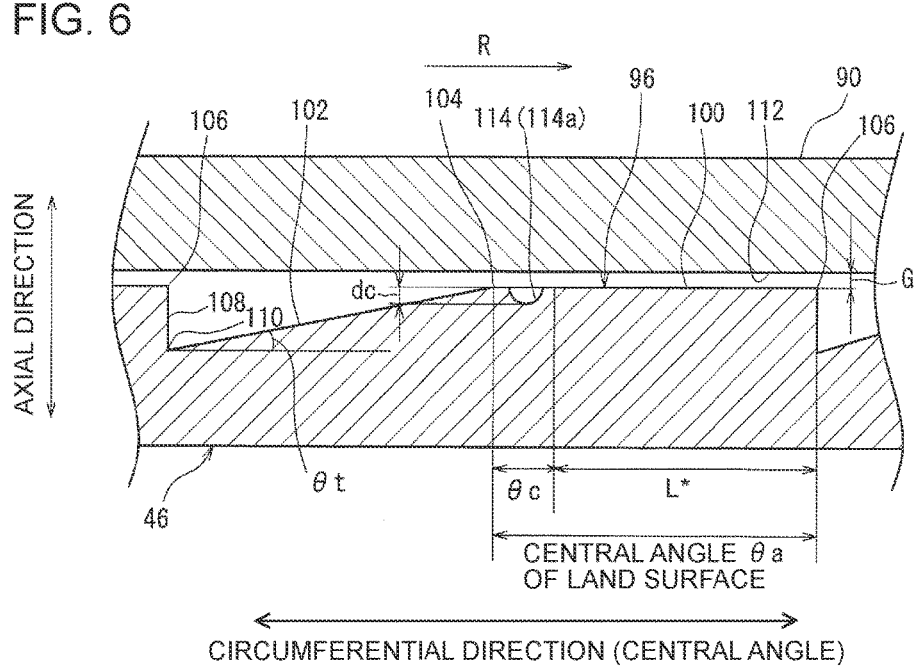
FIG. 6 is an exploded view of a partial cross section taken along line VI-VI in FIG. 4.

FIG. 3 is a planar view schematically showing the thrust member 48. FIG. 4 is an enlarged view of region IV in FIG. 3. FIG. 5 is an enlarged perspective view of region IV in FIG. 3. FIG. 6 is an exploded view of a partial cross section taken along line VI-VI in FIG. 4.

As shown in FIGS. 3 to 6, the thrust portion 96 of the thrust member 48 includes a plurality of land surfaces 100 and a plurality of tapered surfaces 102 disposed alternately in the circumferential direction of the through hole 94.

The plurality of land surfaces 100 are parallel to a plane that is orthogonal to an axis of the drive shaft (rotary shaft) 24, which is the axis 26, and disposed at intervals in the circumferential direction of the through hole 94. Each land surface 100 has boundaries 104, 106 on either side in the circumferential direction, and the boundaries 104, 106 extend along the radial direction of the through hole 94. Each land surface 100 has a contour of a sector shape, and the land surfaces 100 are disposed flush on a plane orthogonal to the axis 26.

The tapered surfaces 102 are each disposed between adjacent two of the plurality of land surfaces 100 in the circumferential direction of the through hole 94. Each tapered surface 102 is joined to the boundary 106 of the land surface 100 on one side in the circumferential direction of the through hole 94 via a step 108, and is joined continuously to the boundary 104 of the land surface 100 on the other side in the circumferential direction of the through hole 94. Accordingly, the boundary 110 on one side of the tapered surface 102 is away from the land surface 100 in the axial direction of the through hole 94. Each tapered surface 102 extends around the axis 26 in a spiral shape, and is inclined from a plane orthogonal to the axis 26 at an inclination angle $\theta t$.

The boundary 104 is disposed upstream of the boundary 106 in a rotational direction R of the flange portion 90 facing the thrust portion 96. The flange portion 90 includes a thrust portion 112 which is in slide contact with the plurality of land surfaces 100 via lubricant oil, and the thrust portion 112 is formed by a flat surface of an annular shape facing the plurality of land surfaces 110 and the plurality of tapered surfaces 102.

The flat surface of the thrust portion 112 is parallel to a plane orthogonal to the axis 26, with a space of a tapered wedge shape that gradually narrows along the rotational direction R formed between the flat surface of the thrust portion 112 and each tapered surface 102, and a bearing gap G connecting to the wedge-shape spaces formed between the flat surface of the thrust portion 112 and each land surface 100 which are parallel to each other. Lubricant oil flows into the bearing gap G from the side of the boundary 104 through the wedge-shape space in the circumferential direction of the through hole 94, accompanying rotation of the flange portion 90.

Further, an outer rim of the flat surface forming the thrust portion 112 of the flange portion 90 has a diameter substantially equal to the diameter D of the outer circumferential edge of the land surfaces 100.

There is at least one concave portion 114 disposed on each of the land surfaces 100.

With this configuration, at least one concave portion 114 is formed on each land surface 100, and thereby the bearing gap G is widened in the region with the concave portion 114 formed therein, between the thrust portion 96 of the thrust member 48 and the thrust portion 112 of the flange portion 90 in slide contact of the thrust portion 96 via lubricant oil, and it is possible to reduce the area or the circumferential length of the land surface 100 substantially. As a result of reduction of the substantial area or circumferential length of the land surface 100, mechanical loss of the thrust bearing device is reduced, and mechanical efficiency improves.

Further, forming the concave portion 114 is easier than changing the contour of the land surfaces 100 to reduce the area of the land surfaces 100. Thus, with the above configuration, even if the land surfaces 100 are small, it is possible to reduce the substantial area of the land surfaces 100 at high accuracy.

Further, a method of forming the concave portion 114 is not particularly limited, and for instance, the concave portion 114 may be formed by pressing a mold with a projection against the land surfaces 100, or by irradiating the land surfaces 100 with laser.

Accordingly, with the above configuration, the thrust bearing device has excellent mechanical efficiency, and thus the torque of the turbine blade 16 is transmitted to the impeller 20 with reduced loss. As a result, the turbocharger also has excellent mechanical efficiency.

In some embodiments, the plurality of land surfaces 100 comprises three or more land surfaces 100, and the diameter D of the outer circumference of the plurality of land surfaces 100 is 15 mm or less, and the inclination angle θt of the tapered surfaces 102 is in a range of from $1e-5°(=1\times10^{-5°})$ to 1.0°.

With this configuration, the plurality of land surfaces 100 comprises three or more land surfaces 100, and the diameter D of the outer circumference of the plurality of land surfaces 100 is 15 mm or less, and the inclination angle θt of the tapered surfaces 102 is in a range of from 1e-5° to 1.0°, but still the substantial area of the land surfaces 100 can be reduced easily without changing the contour of the land surfaces 100, by forming the at least one concave portion 114.

In some embodiments, the at least one concave portion 114 comprises a plurality of concave portions 114.

With this configuration, the plurality of concave portions 114 is provided to reduce the area of the land surfaces 100 substantially, and thus it is possible to reduce the area of the land surfaces 100 substantially at high accuracy by adjusting the number of the concave portions 114.

In some embodiments, the plurality of concave portions 114 comprises a plurality of first concave portions 114a disposed along the radial direction of the through hole 94, and for each of the plurality of land surfaces 100, the plurality of first concave portions 114a is disposed within a region of from 10% to 20% central angle from the boundary 104 of the land surface 100. In other words, the central angle θc of the region in which the first concave portions are formed is within a range of from 10% to 20% of the central angle θa of the land surface 100. Further, each of the plurality of first concave portions 114a has a depth dc in a range of from 0.001 mm to 0.025 mm.

With this configuration, the first concave portions 114a disposed in the radial direction in a predetermined region in the vicinity of the boundary 104 has a depth dc in a range of from 0.001 mm to 0.025 mm, and thereby it is possible to reduce the area of the land surfaces 100 substantially and securely with the first concave portions 114a. Specifically, the first concave portions 114a reduce the substantial area at the upstream side of the land surfaces 100 in the rotational direction R.

Figure 7:
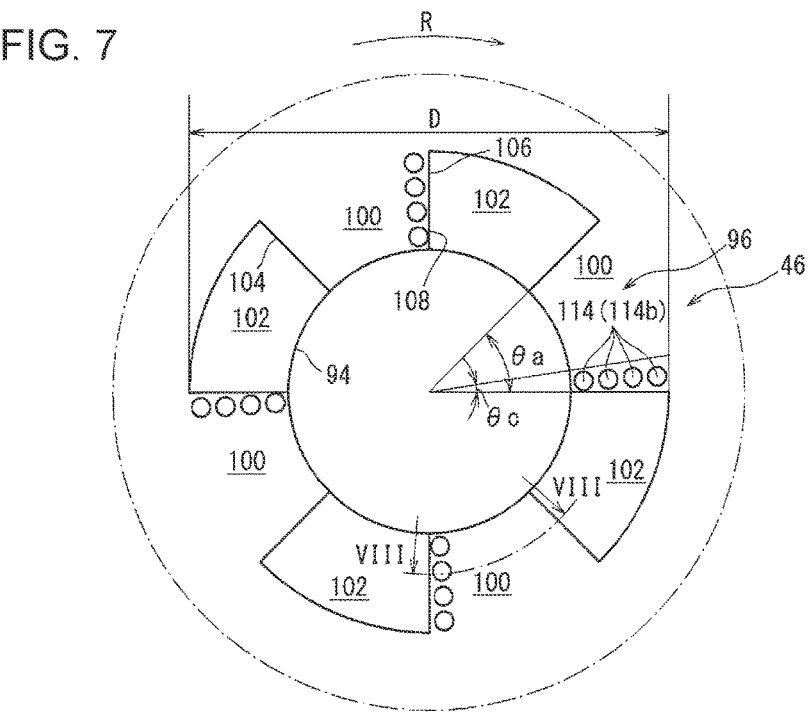
FIG. 7 is a schematic planar view corresponding to FIG. 4, according to some embodiments.
Figure 8:
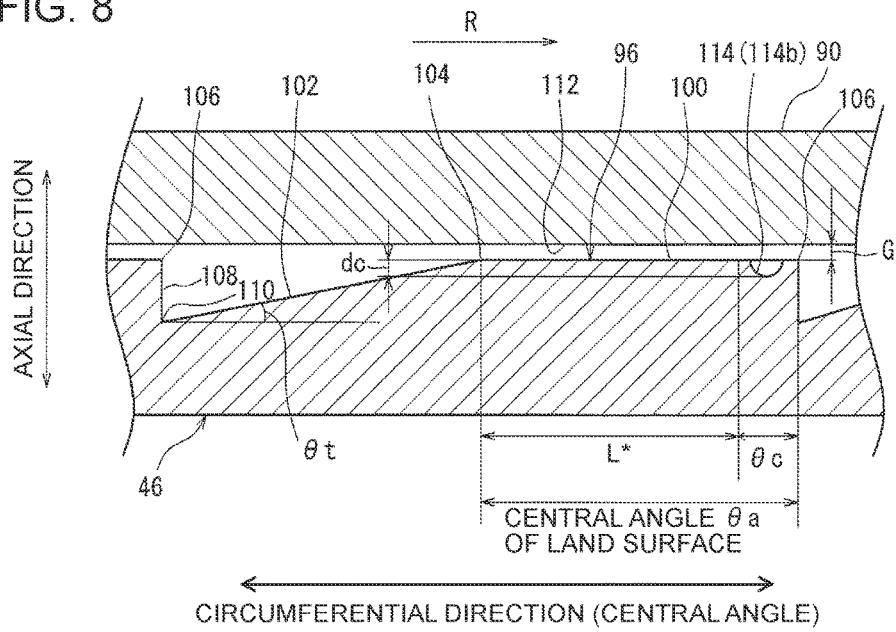
FIG. 8 is an exploded view of a partial cross section taken along line VIII-VIII in FIG. 7.

FIG. 7 is a schematic planar view corresponding to FIG. 4, according to some embodiments. FIG. 8 is an exploded view of a partial cross section taken along line VIII-VIII in FIG. 7.

As shown in FIGS. 7 and 8, in some embodiments, the plurality of first concave portions 114b disposed along the radial direction of the through hole 94 are within a region of from 10% to 20% central angle from the boundary 106 of the land surface 100. In other words, the central angle θc of the region in which the first concave portions 114a are formed is within a range of from 10% to 20% of the central angle θa of the land surface 100. Further, each of the plurality of first concave portions 114b has a depth dc in a range of from 0.001 mm to 0.025 mm.

With this configuration, the first concave portions 114b disposed in the radial direction in a predetermined region in the vicinity of the boundary 106 has a depth dc in a range of from 0.001 mm to 0.025 mm, and thereby it is possible to reduce the substantial area of the land surfaces 100 securely with the first concave portions 114b. Specifically, the first concave portions 114b reduce the substantial area at the downstream side of the land surfaces 100 in the rotational direction R.

Figure 9:
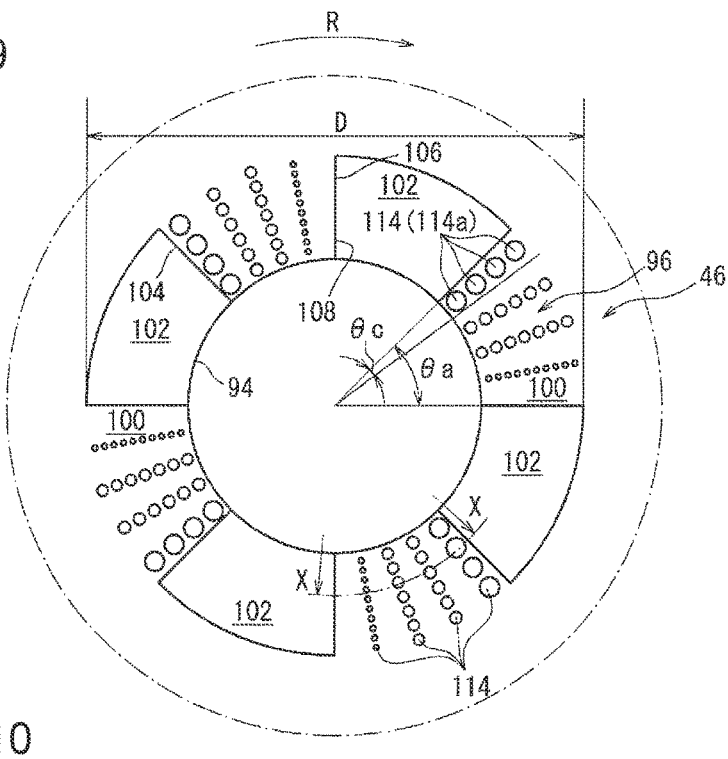
FIG. 9 is a schematic planar view corresponding to FIG. 4, according to some embodiments.
Figure 10:
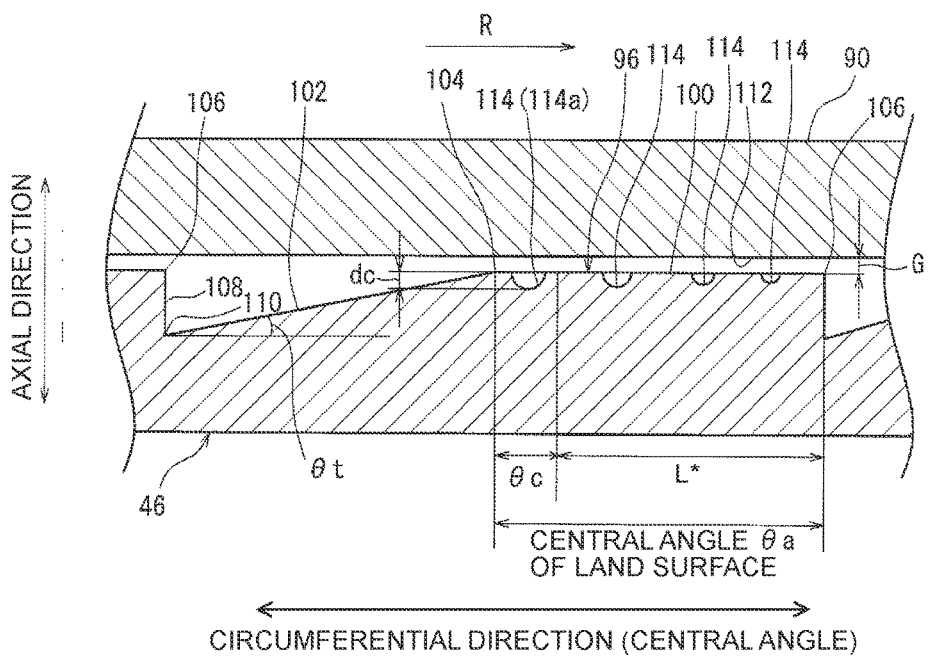
FIG. 10 is an exploded view of a partial cross section taken along line X-X in FIG. 9.
Figure 11:
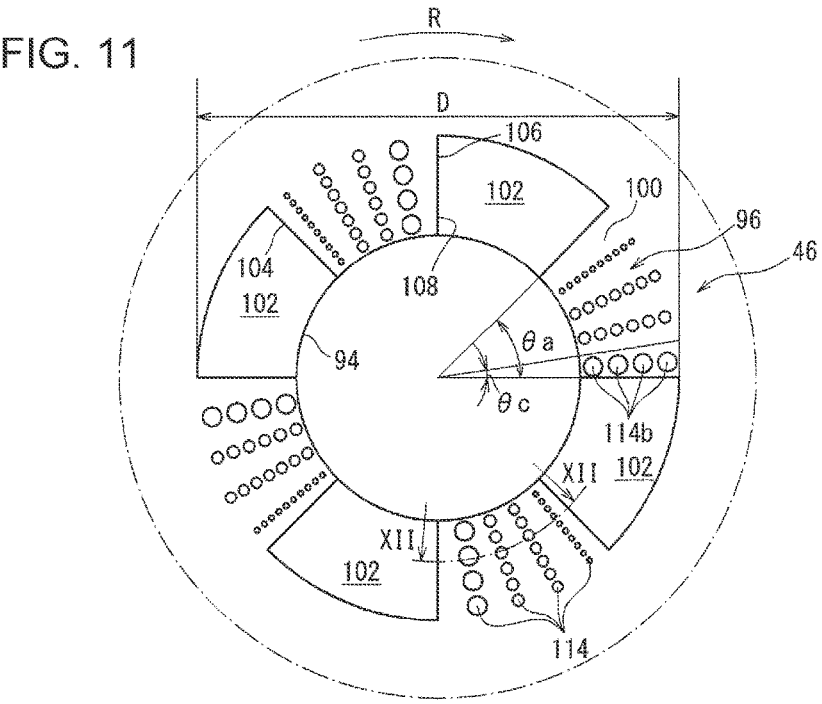
FIG. 11 is a schematic planar view corresponding to FIG. 4, according to some embodiments.
Figure 12:
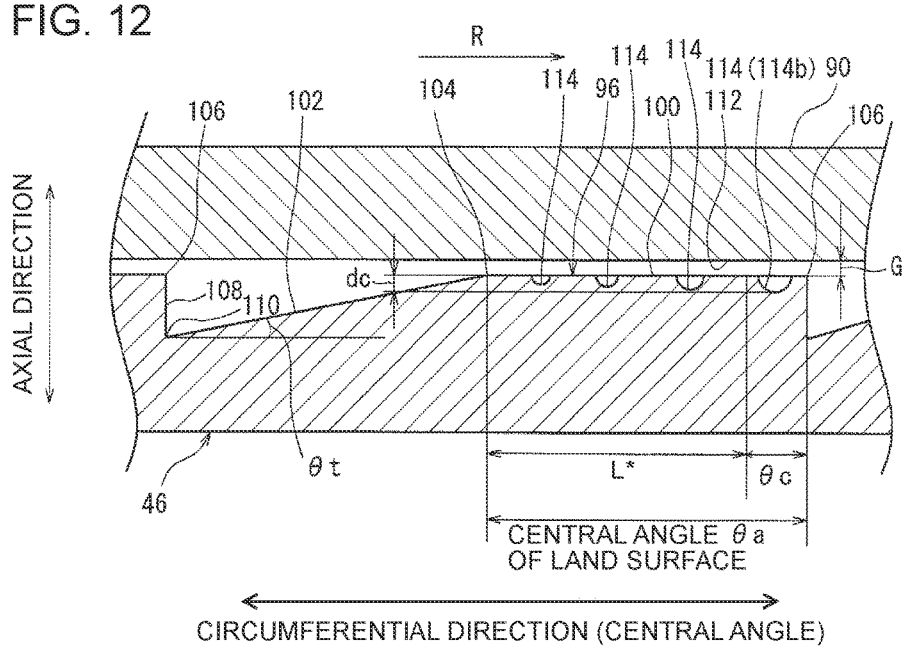
FIG. 12 is an exploded view of a partial cross section taken along line XII-XII in FIG. 11.

FIGS. 9 and 11 are each a schematic planar view corresponding to FIG. 4, according to some embodiments. FIGS. 10 and 12 are each an exploded view of a partial cross section taken along line XII-XII in FIG. 11.

As shown in FIGS. 9 to 12, in some embodiments, the plurality of concave portions 114 is disposed along the radial direction and the circumferential direction of the through hole 94. A part of the plurality of concave portions 114 comprises a plurality of first concave portions 114a, 114b disposed along the radial direction of the through hole 94, and for each of the plurality of land surfaces 100, the plurality of first concave portions 114a, 114b is disposed within a region of from 10% to 20% of central angle from the boundaries 104, 106 of the land surface 100. Further, each of the plurality of first concave portions 114a, 114b has a depth dc in a range of from 0.001 mm to 0.025 mm.

With this configuration, the first concave portions 114a, 114b disposed in the radial direction in a predetermined region in the vicinity of the boundaries 104, 106 have a depth dc in a range of from 0.001 mm to 0.025 mm, and thereby it is possible to reduce the substantial area of the land surfaces 100 securely with the first concave portions 114a, 114b.

As shown in FIGS. 9 to 12, in some embodiments, the plurality of concave portions 114 have depths which are varied in stages in the circumferential direction of the through hole 94.

With this configuration, the depths of the concave portions 114 are varied in stages, and thereby it is possible to adjust a pressure distribution of lubricant oil in the bearing gap G formed by the land surfaces 100. In FIGS. 9 and 10, the depths of the concave portions 114 decrease toward the downstream side in the rotational direction R. In contrast, in FIGS. 11 and 12, the depths of the concave portions 114 increase toward the downstream side in the rotational direction R.

Figure 13:
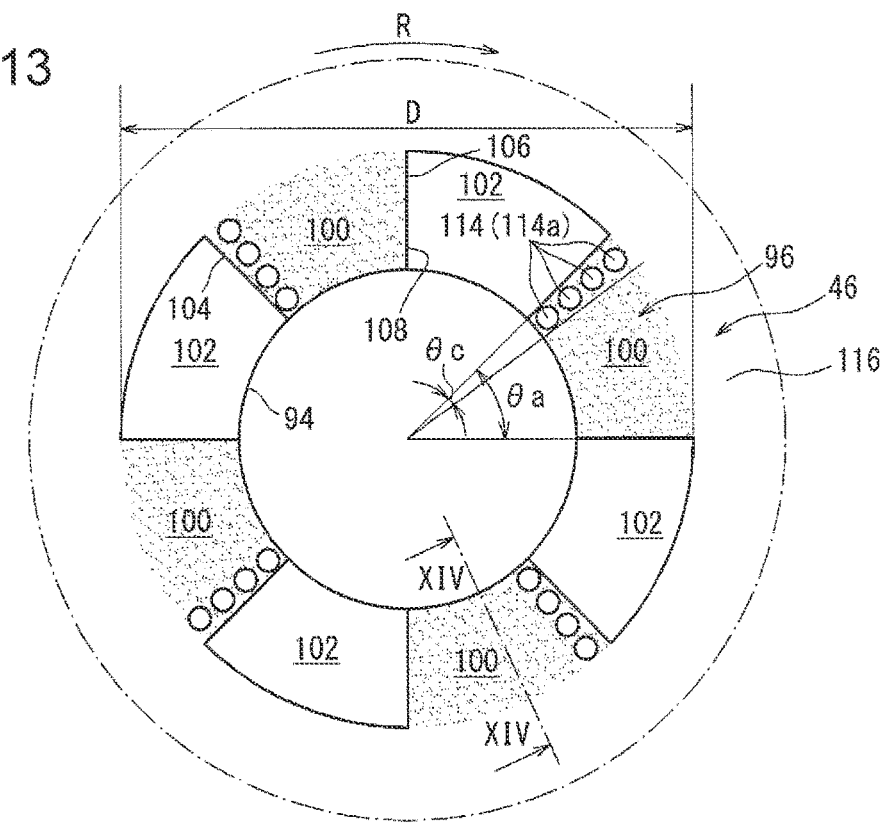
FIG. 13 is a schematic planar view corresponding to FIG. 4, according to some embodiments.
Figure 14:
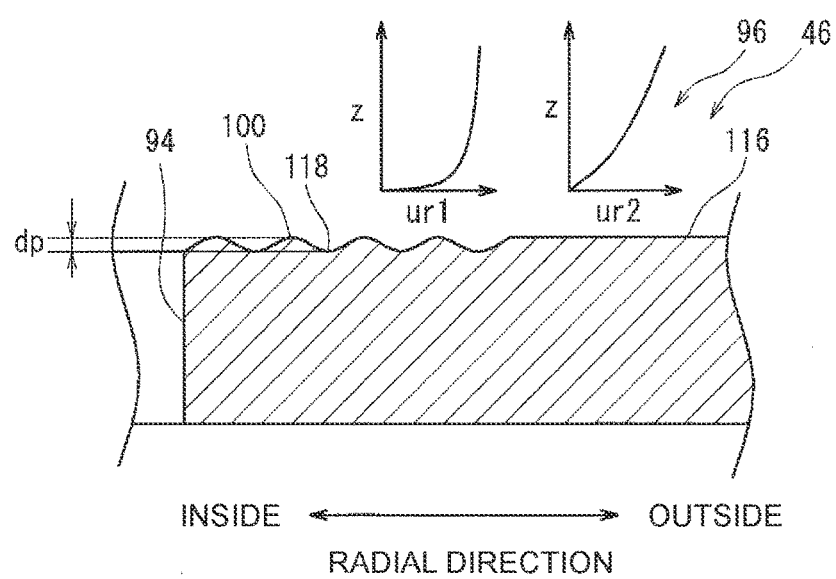
FIG. 14 is a view of a partial cross section taken along line XIV-XIV in FIG. 13.

FIG. 13 is a schematic planar view corresponding to FIG. 4, according to some embodiments. FIG. 14 is a view of a partial cross section taken along line XIV-XIV in FIG. 13.

As depicted in FIGS. 13 and 14, in some embodiments, the thrust portion 96 further includes an annular surface 116 extending along the outer circumferential edges of the land surfaces 100 and the outer circumferential edges of the tapered surfaces 102 in the circumferential direction of the through hole 94. The annular surface 116 is formed by a flat surface which is flush with the plurality of land surfaces 100, and the land surfaces 100 have a surface roughness greater than the surface roughness of the annular surface 116.

If lubricant oil is supplied onto the tapered surface 102 outward in the radial direction of the through hole 94, the lubricant oil may try to flow out outward in the radial direction also in the bearing gap G formed by the land surfaces 100. If a flow direction of lubricant oil can be oriented in the circumferential direction, it is possible to increase a pressure of lubricant oil in the bearing gap G.

In this regard, if the surface roughness of the land surfaces 100 is greater than the surface roughness of the annular surface 116, the annular surface 116 is smoother and thus a relatively thicker layer is formed on the annular surface 116 than on the land surfaces 100. Thus, when the lubricant oil flows out from the bearing gap G outward in the radial direction, a radial speed ur1 of the lubricant oil decreases to a radial speed ur2 outside the outer circumferential edges of the land surfaces 100, and the pressure of the lubricant oil increases in accordance. This pressure difference becomes an obstacle that reduces outflow of the lubricant oil from the bearing gap G outward in the radial direction, and thereby the lubricant oil can flow along the circumferential direction.

In some embodiments, a plurality of microscopic holes 118 is disposed on each of the plurality of land surfaces 100, and the plurality of microscopic holes 118 has a 1/10 to 1/100 depth of the depth of the at least one concave portion 114 or the depth dc of the first concave portions 114a, 114b.

With this configuration, besides the concave portions 114, the plurality of microscopic holes 118 having a depth 1/10 to 1/100 times the depth of the at least one concave portion 114 or the depth dc of the first concave portions 114a, 114b is provided, and thereby it is possible to achieve a greater surface roughness for the land surfaces 100 than for the annular surface 116.

Figure 15:
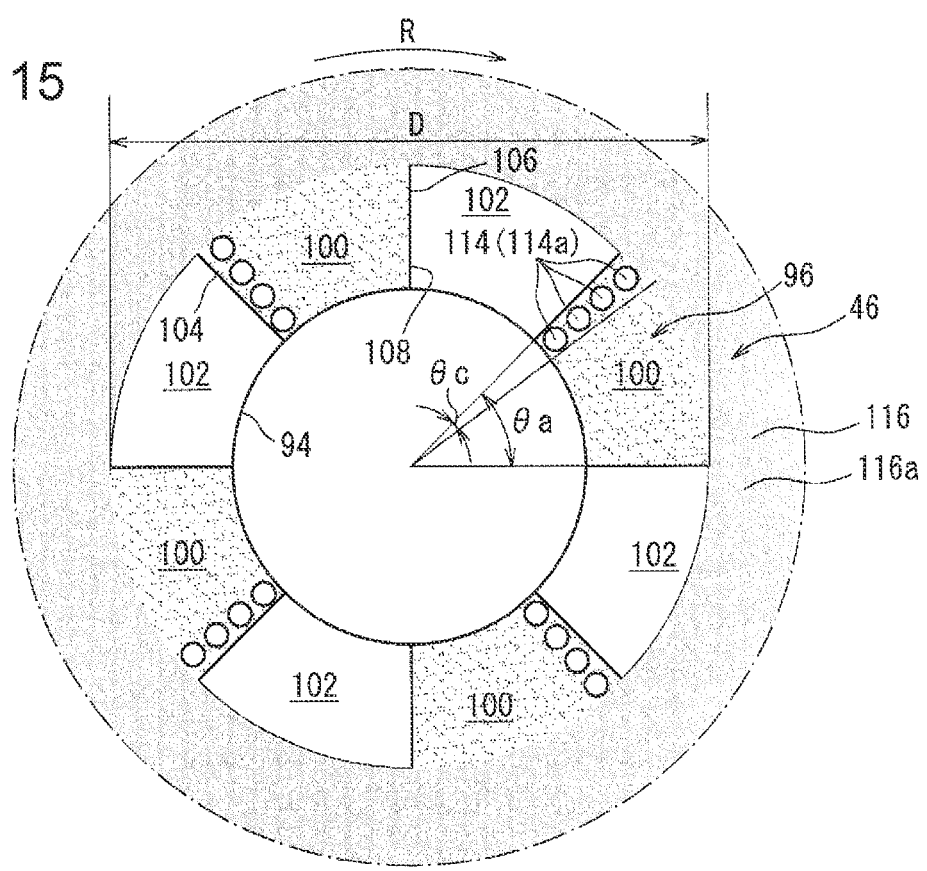
FIG. 15 is a schematic planar view corresponding to FIG. 4, according to some embodiments.

FIG. 15 is a schematic planar view corresponding to FIG. 4, according to some embodiments.

In some embodiments, the plurality of microscopic holes 118 on the land surfaces 100 are formed by small holes of a porous material, and the annular surface 116 is formed by a cover member 116a which covers the porous material, as depicted in FIG. 15. The porous material comprises, for instance, a sintered compact, and the cover member 116a comprises, for instance, a resin.

With this configuration, in the region forming the annular surface 116, the porous material is covered with the cover member 116a, and thereby it is possible to achieve a smaller surface roughness for the annular surface 116 than for the land surfaces 100.

Figure 16:
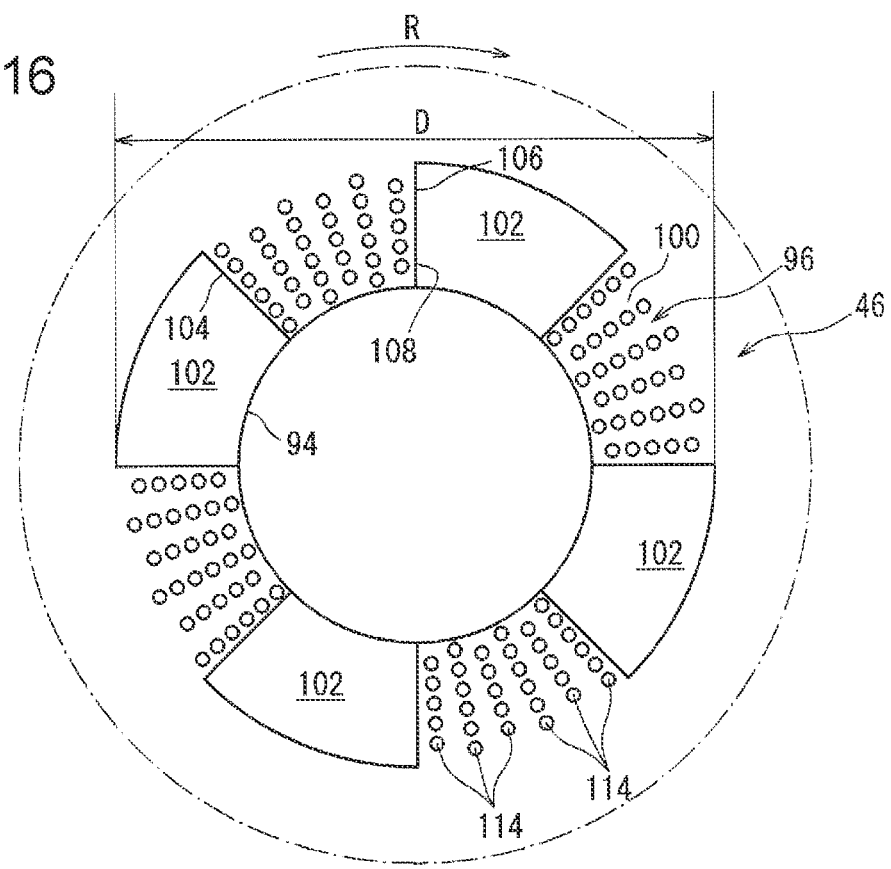
FIG. 16 is a schematic planar view corresponding to FIG. 4, according to some embodiments.

FIG. 16 is a schematic planar view corresponding to FIG. 4, according to some embodiments.

As shown in FIG. 16, in some embodiments, the plurality of concave portions 114 is disposed along the radial direction and the circumferential direction of the through hole 94. For instance, each of the plurality of concave portions 114 has a depth in a range of from 0.001 mm to 0.025 mm, and the total opening area of the plurality of concave portions 114 is in a range of from 10% to 50% of the area of each land surface 100.

With this configuration, forming the plurality of concave portions 114 makes it possible to enlarge the average bearing gap G including the plurality of concave portions 114 and to reduce mechanical loss. Further, while the concave portions 114 are disposed in a staggered or zigzag pattern in the circumferential direction in FIG. 16, the concave portions 114 may be disposed in a row in the circumferential direction.

Figure 17:
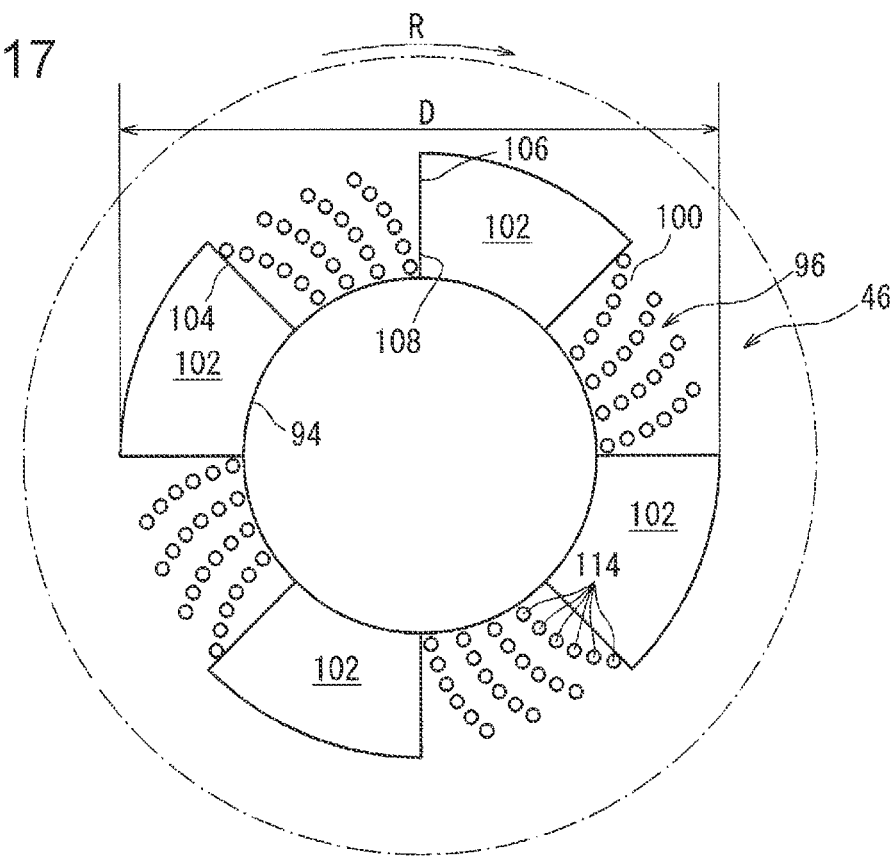
FIG. 17 is a schematic planar view corresponding to FIG. 4, according to some embodiments.

FIG. 17 is a schematic planar view corresponding to FIG. 4, according to some embodiments.

As shown in FIG. 17, in some embodiments, the plurality of concave portions 114 is disposed in a spiral pattern. Specifically, the plurality of concave portions 114 is disposed to form a plurality of rows which extend to gradually deviate from the radial direction toward the outer side in the radial direction. Each raw is disposed so as to get closer to the upstream side in the rotational direction R toward the outer side in the radial direction. For instance, each of the plurality of concave portions 114 has a depth in a range of from 0.001 mm to 0.025 mm, and the total opening area of the plurality of concave portions 114 is in a range of from 10% to 50% of the area of each land surface 100.

With this configuration, the plurality of concave portions 114 arranged in a spiral pattern makes it possible to guide lubricant oil along the circumferential direction of the land surfaces 100 in the bearing gap G formed by the land surfaces 100, and to increase a pressure of lubricant oil in the bearing gap G efficiently.

Figure 18:
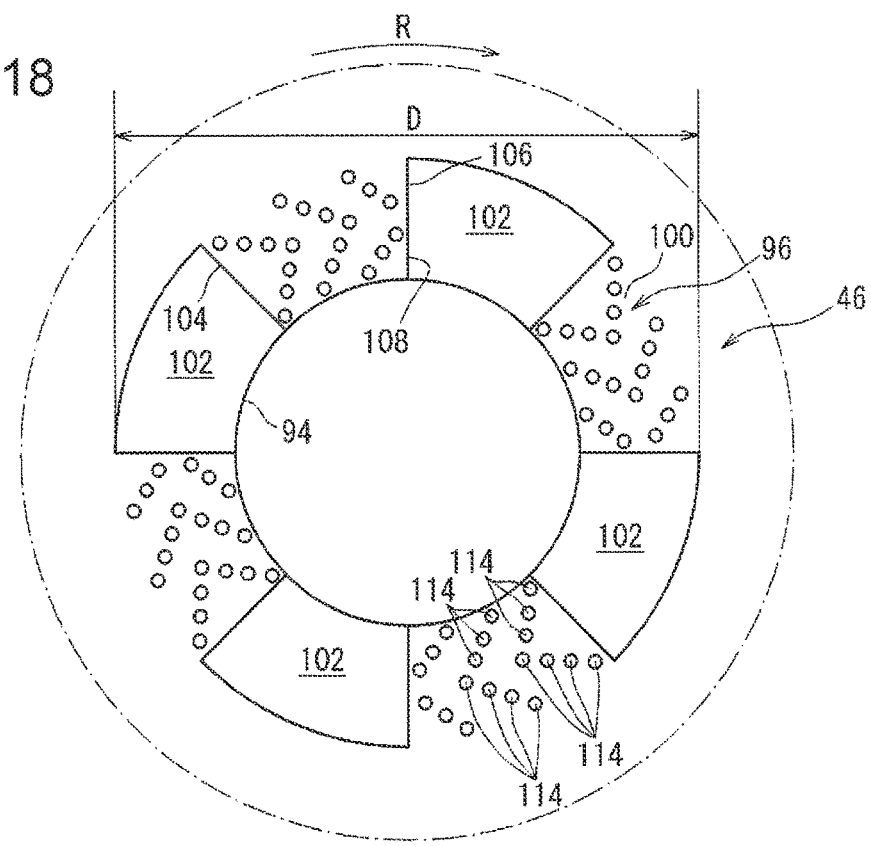
FIG. 18 is a schematic planar view corresponding to FIG. 4, according to some embodiments.

FIG. 18 is a schematic planar view corresponding to FIG. 4, according to some embodiments.

As shown in FIG. 18, in some embodiments, the plurality of concave portions 114 is disposed in a herringbone or V-shape pattern. For instance, each of the plurality of concave portions 114 has a depth in a range of from 0.001 mm to 0.025 mm, and the total opening area of the plurality of concave portions 114 is in a range of from 10% to 50% of the area of each land surface 100.

With this configuration, the plurality of concave portions 114 is arranged in a herringbone pattern or a V-shape pattern with an open side facing the upstream side in the rotational direction R, and thereby it is possible to guide lubricant oil along the circumferential direction of the land surfaces 100 in the bearing gap G formed by the land surfaces 100, and to increase a pressure of lubricant oil in the bearing gap G efficiently.

Figure 19:
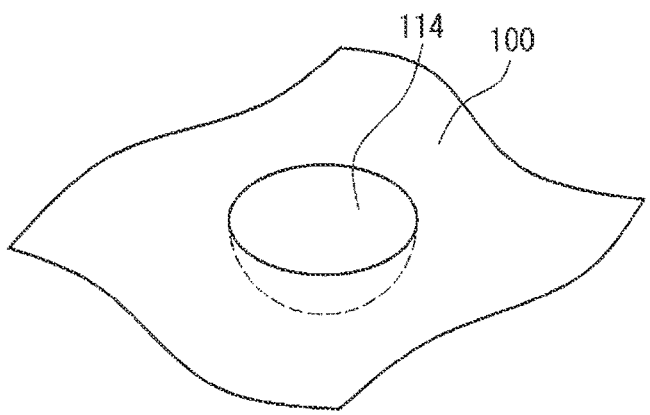
FIG. 19 is a schematic perspective view for describing a shape of a concave portion according to some embodiments.
Figure 20:
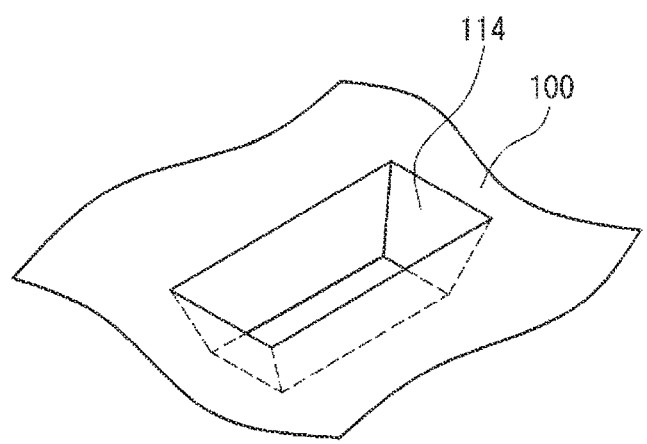
FIG. 20 is a schematic perspective view for describing a shape of a concave portion according to some embodiments.

FIGS. 19 and 20 are schematic perspective views for describing a shape of the concave portion 114 according to some embodiments.

In FIG. 19, the concave portion 114 has a semi-sphere shape with a circular opening. In FIG. 20, the concave portion 114 has a cuboid or truncated rectangular pyramid shape with a rectangular opening. The shape of the concave portion 114 is not limited thereto, and may be a truncated conical shape with a circular opening, the shape of the opening of the concave portion 114 may be an oval shape or an ellipse shape, or the concave portion 114 may have a slit shape.

Figure 21:
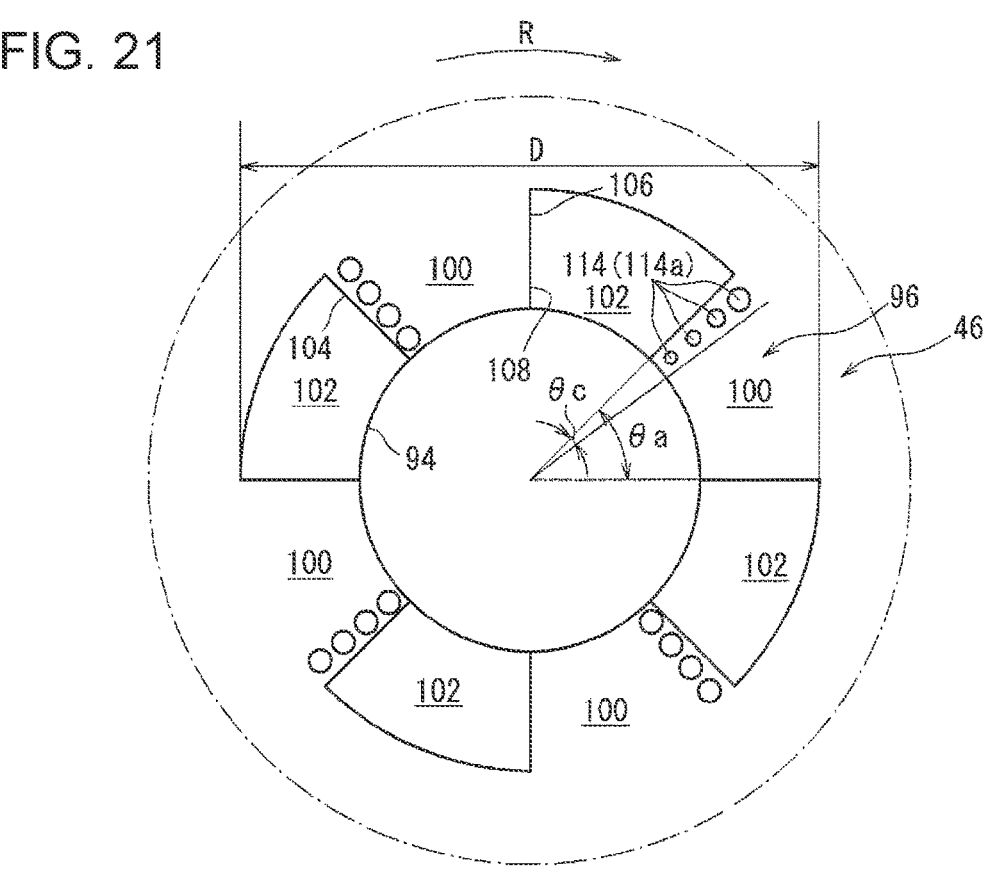
FIG. 21 is a schematic planar view corresponding to FIG. 4, according to some embodiments.

FIG. 21 is a schematic planar view corresponding to FIG. 4, according to some embodiments.

As shown in FIG. 21, in some embodiments, the plurality of first concave portions 114a have opening areas which increase in stages outward in the radial direction of the through hole 94.

With this configuration, the opening areas of the first concave portions 114a increase outward in the radial direction, and thereby it is possible to reduce the length of the circumferential direction of the land surfaces 100 substantially at a constant ratio regardless of the radial position.

In some embodiments, the plurality of first concave portions 114b in FIG. 7 also have opening areas which increase in stages outward in the radial direction of the through hole 94.

Embodiments of the present invention were described in detail above, but the present invention is not limited thereto, and various amendments and modifications may be implemented.

For instance, in the embodiments depicted in FIGS. 7, 9, 11, 16 to 18, and 21, the annular surface 116 may also be provided as in the embodiments depicted in FIGS. 13 to 15. While the thrust collar 50 and the thrust sleeve 52 of the above described embodiments include the sleeve portions 92 (92a, 92b) and the flange portions 90 (90a, 90b) formed integrally, the sleeve portions 92 and the flange portions 90 may be separate pieces. It is sufficient if the flange portions 90 are fitted onto the drive shaft 24 so as to be rotatable with the drive shaft 24.

In the above described embodiments, the thrust member 48 is interposed between the two flange portions 90 (90a, 90b), and the thrust portions 96 are formed on either side of the thrust member 48. Alternately, the thrust portion 96 may be disposed on only one side, and one flange portion 90 may be disposed to face the thrust portion 96.

In the above described embodiments, the land surfaces 100, the tapered surface 102, and the concave portions 114 are disposed on the thrust portion (the second thrust portion) 96 of the thrust member 48, which is a fixed member, and the flat surface of an annular shape is disposed on the thrust portion (first thrust portion) 112 of the flange portion 90, which is a movable member. Conversely, the flat surface of an annular shape may be disposed on the thrust portion 96 of the fixed thrust member 48, and the land surfaces 100, the tapered surfaces 102, and the concave portions 114 may be disposed on the thrust portion 112 of the movable flange portion 90.

While the shaft section 80, the large-diameter section 82, and the middle section 84 are integrally formed in some embodiments described above, the shaft section 80 and the middle section 84 may be formed of a stud bolt or the like provided as a separate piece from the large-diameter section 82. Further, the stepped portion 86 may be formed of a snap ring or the like fitted on to the middle section 84.

Further, the centrifugal compressor may be of variable displacement type.

DESCRIPTION OF REFERENCE NUMERAL

10 Turbine
12 Compressor
14 Turbine housing
16 Turbine blade
18 Compressor housing
20 Impeller
22 Bearing housing
24 Drive shaft (rotary shaft)
26 Axis
28 Cylindrical section
30 Scroll section
32 Throat portion
34 End wall
36 Seal portion
38 Seal ring
40 Back plate
42 Peripheral wall
44 Bearing section
46 Floating bush
48 Thrust member
50 Thrust collar
52 Thrust sleeve
54 Oil feed port
56 Oil drain port
58 Oil deflector
60 Lid member
62 Fixing ring
64 Cylindrical section
66 Scroll section
68 Diffuser section
70 Hub
72 Blade
72a Full blade
72b Splitter blade
74 Outer peripheral surface
76 Back surface
78 Attachment hole
80 Shaft section
82 Large-diameter section
84 Middle section
86 Stepped portion
88 Fastening member
90 (90a, 90b) Flange portion
92 (92a, 92b) Sleeve portion
94 Through hole
96 (96a, 96b) Thrust portion (second thrust portion)
98 Oil feed hole
100 Land surface
102 Tapered surface
104 Boundary
106 Boundary
108 Step
110 Boundary
112 Thrust portion (first thrust portion)
114 Concave portion
114a First concave portion
116 Annular surface
116a Resin member
118 Microscopic hole

The invention claimed is:

1. A tapered land thrust bearing device, comprising:
a rotary shaft;
a flange portion fitted onto the rotary shaft and including a first thrust portion; and
a thrust member including a through hole through which the rotary shaft is inserted and a second thrust portion which is disposed around the through hole and which faces the first thrust portion of the flange portion,
wherein one of the first thrust portion or the second thrust portion includes
a plurality of land surfaces each of which is parallel to a plane orthogonal to an axis of the rotary shaft, the land surfaces being disposed at intervals in a circumferential direction of the through hole,
a plurality of tapered surfaces each of which is disposed between the plurality of land surfaces, joined via a step to a first boundary of one of the land surfaces on one side in the circumferential direction of the through hole, and joined continuously to a second boundary of another one of the land surfaces on the other side in the circumferential direction of the through hole, and
at least one concave portion disposed on each of the plurality of land surfaces,
wherein the at least one concave portion comprises a plurality of concave portions,
wherein the plurality of concave portions comprises a plurality of first concave portions disposed along a radial direction of the through hole,
wherein, on each of the plurality of land surfaces, the plurality of first concave portions are disposed within a region of from 10% to 20% of an angle formed by the adjacent first and second boundaries in the circumferential direction from the second boundary of the land surface, and wherein each of the plurality of first concave portions has a depth within a range of from 0.001 mm to 0.025 mm.

2. The tapered land thrust bearing device according to claim 1, wherein the plurality of land surfaces comprises three or more land surfaces, wherein a diameter of an outer circumference of the plurality of land surfaces is not more than 15 mm, and wherein an inclination angle of the tapered surfaces is within a range of from 1 e-5° to 1.0°.

3. The tapered land thrust bearing device according to claim 1, wherein opening areas of the first concave portions increase outward in stages in the radial direction of the through hole.

4. A turbocharger, comprising: a tapered land thrust bearing device according to claim 1; a centrifugal compressor including an impeller; and a turbine including a turbine blade, wherein the turbine blade and the impeller are coupled to each other via the rotary shaft.

5. A tapered land thrust bearing device, comprising:
a rotary shaft;
a flange portion fitted onto the rotary shaft and including a first thrust portion; and
a thrust member including a through hole through which the rotary shaft is inserted and a second thrust portion which is disposed around the through hole and which faces the first thrust portion of the flange portion,
wherein one of the first thrust portion or the second thrust portion includes
a plurality of land surfaces each of which is parallel to a plane orthogonal to an axis of the rotary shaft,
the land surfaces being disposed at intervals in a circumferential direction of the through hole,
a plurality of tapered surfaces each of which is disposed between the plurality of land surfaces, joined via a step to a first boundary of one of the land surfaces on one side in the circumferential direction of the through hole, and joined continuously to a second boundary of another one of the land surfaces on the other side in the circumferential direction of the through hole, and
at least one concave portion disposed on each of the plurality of land surfaces,
wherein the at least one concave portion comprises a plurality of concave portions,
wherein the plurality of concave portions are disposed along the radial direction and the circumferential direction of the through hole,
wherein a plurality of first concave portions disposed along the radial direction of the through hole are a part of the plurality of concave portions,
wherein, on each of the plurality of land surfaces, the plurality of first concave portions are disposed within a region of from 10% to 20% of an angle formed by the adjacent first and second boundaries in the circumferential direction from the first or second boundary of the land surface, and
wherein each of the plurality of first concave portions has a depth within a range of from 0.001 mm to 0.025 mm.

6. The tapered land thrust bearing device according to claim 5, wherein depths of the plurality of concave portions change in stages along the circumferential direction of the through hole.

7. The tapered land thrust bearing device according to claim 5, wherein the plurality of land surfaces comprises three or more land surfaces, wherein a diameter of an outer circumference of the plurality of land surfaces is not more than 15 mm, and wherein an inclination angle of the tapered surfaces is with a range of from 1e-5° to 1.0°.

8. A turbocharger, comprising:
a tapered land thrust bearing device according to claim 5;
a centrifugal compressor including an impeller; and
a turbine including a turbine blade,
wherein the turbine blade and the impeller are coupled to each other via the rotary shaft.

9. A tapered land thrust bearing device, comprising a rotary shaft;
a flange portion fitted onto the rotary shaft and including a first thrust portion, and
a thrust member including a through hole through which the rotary shaft is inserted and a second thrust portion which is disposed around the through hole and which faces the first thrust portion of the flange portion,
wherein one of the first thrust portion or the second thrust portion includes
a plurality of land surfaces each of which is parallel to a plane orthogonal to an axis of the rotary shaft,
the land surfaces being disposed at intervals in a circumferential direction of the through hole,
a plurality of tapered surfaces each of which is disposed between the plurality of land surfaces, joined via a step to a first boundary of one of the land surfaces on one side in the circumferential direction of the through hole, and joined continuously to a second boundary of another one of the land surfaces on the other side in the circumferential direction of the through hole, and
at least one concave portion disposed on each of the plurality of land surfaces,
wherein the at least one concave portion comprises a plurality of concave portions; and
wherein the plurality of concave portions are disposed in a spiral pattern or a herringbone pattern.

10. The tapered land thrust bearing device according to claim 9, wherein the plurality of land surfaces comprises three or more land surfaces, wherein a diameter of an outer circumference of the plurality of land surfaces is not more than 15 mm, and wherein an inclination angle of the tapered surfaces is within a range of from 1e-5° to 1.0°.

11. A turbocharger, comprising:
a tapered land thrust bearing device according to claim 9;
a centrifugal compressor including an impeller; and
a turbine including a turbine blade,
wherein the turbine blade and the impeller are coupled to each other via the rotary shaft.

12. A tapered land thrust bearing device, comprising:
a rotary shaft;
a flange portion fitted onto the rotary shaft and including a first thrust portion; and
a thrust member including a through hole through which the rotary shaft is inserted and a second thrust portion which is disposed around the through hole and which faces the first thrust portion of the flange portion,
wherein one of the first thrust portion or the second thrust portion includes
a plurality of land surfaces each of which is parallel to a plane orthogonal to an axis of the rotary shaft, the land surfaces being disposed at intervals in a circumferential direction of the through hole, plurality of tapered surfaces each of which is disposed between the plurality of land surfaces, joined via a step to a first boundary of one of the land surfaces on one side in the circumferential direction of the through hole, and joined continuously to a second boundary of another one of the land surfaces on the other side in the circumferential direction of the through hole, and at least one concave portion disposed on each of the plurality of land surfaces, wherein one of the first thrust portion or the second thrust portion further includes an annular surface which extends along outer circumferential edges of the land surfaces and outer circumferential edges of the tapered surfaces in the circumferential direction of the through hole, and wherein a surface roughness of the land surfaces is greater than a surface roughness of the annular surface, and wherein a plurality of microscopic holes are formed on each of the plurality of land surfaces, and wherein each of the plurality of microscopic holes has a depth which is $1/10$ to $1/100$ times a depth of the at least one concave portion.

13. The tapered land thrust bearing device according to claim 12, wherein the plurality of microscopic holes on the land surfaces comprises small holes of a porous material, and wherein the annular surface comprises a cover material which covers the porous material.

14. A turbocharger, comprising:

a tapered land thrust bearing device according to claim 12;

a centrifugal compressor including an impeller; and a turbine including a turbine blade, wherein the turbine blade and the impeller are coupled to each other via the rotary shaft.

* * * * *